(12) United States Patent
Zhao et al.

(10) Patent No.: US 9,774,598 B2
(45) Date of Patent: Sep. 26, 2017

(54) INFORMATION PROCESSING DEVICE, MANAGEMENT APPARATUS, INFORMATION PROCESSING SYSTEM, INFORMATION PROCESSING METHOD, AND COMPUTER PROGRAM PRODUCT

(71) Applicant: Kabushiki Kaisha Toshiba, Minato-ku (JP)

(72) Inventors: Fangming Zhao, Fuchu (JP); Yuichi Komano, Yokohama (JP); Satoshi Ito, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 29 days.

(21) Appl. No.: 14/468,764

(22) Filed: Aug. 26, 2014

(65) Prior Publication Data

US 2015/0089227 A1  Mar. 26, 2015

(30) Foreign Application Priority Data

Sep. 20, 2013  (JP) ................................ 2013-196053

(51) Int. Cl.
| | |
|---|---|
| *H04L 29/06* | (2006.01) |
| *H04L 9/08* | (2006.01) |
| *H04L 9/32* | (2006.01) |

(52) U.S. Cl.
CPC ........ *H04L 63/0869* (2013.01); *H04L 9/0833* (2013.01); *H04L 9/3263* (2013.01);
(Continued)

(58) Field of Classification Search
CPC . H04L 63/0869; H04L 9/0833; H04L 9/3263; H04L 63/064
(Continued)

(56) References Cited

U.S. PATENT DOCUMENTS 6,889,210 B1 *  5/2005  Vainstein ............ G06F 21/6209
                                                          380/201
7,929,701 B1 *  4/2011  Sprunk ................. G06F 21/606
                                                          380/277
(Continued)

FOREIGN PATENT DOCUMENTS

JP   2010-517330 A   5/2010
JP   2012-165130 A   8/2012
(Continued)

OTHER PUBLICATIONS

Fangming Zhao, et al., "Secure Authenticated Key Exchange with Revocation for Smart Grid", IEEE, Toshiba Corporation, 2011, 8 Pages.

(Continued)

*Primary Examiner* — Jung Kim
*Assistant Examiner* — Thomas Ho
(74) *Attorney, Agent, or Firm* — Oblon, McClelland, Maier & Neustadt, L.L.P.

(57) ABSTRACT

According to an embodiment, an information processing device is connected to a management apparatus via a network. The device includes a receiver, an acquisition unit, an MKB processor, and an authentication unit. The receiver is configured to receive communication information. The acquisition unit is configured to acquire a media key block from the management apparatus, in response to receipt of the communication information from a first external device not belonging to a group previously classified on a management unit basis by the management apparatus, the first external device and the information processing device being enabled to derive a first group key based on the media key block. The MKB processor is configured to generate the group key from a device key of the information processing device and the media key block. The authentication unit is configured to (Continued)

perform encrypted communication with the external device based on an authentication method using the group key.

20 Claims, 9 Drawing Sheets

(52) U.S. Cl.
CPC .......... *H04L 63/065* (2013.01); *H04L 63/105* (2013.01); *H04L 63/108* (2013.01); *H04L 63/205* (2013.01)

(58) Field of Classification Search
USPC ........................................................ 713/169
See application file for complete search history.

(56) References Cited

U.S. PATENT DOCUMENTS

| | | | |
|---|---|---|---|
| 2005/0228988 A1* | 10/2005 | Traw | ........................ H04L 9/083 713/158 |
| 2012/0201376 A1 | 8/2012 | Kambayashi et al. | |
| 2012/0243683 A1* | 9/2012 | Oba | ...................... H04L 9/0836 380/255 |
| 2012/0243685 A1* | 9/2012 | Tanaka | .................. H04L 63/062 380/270 |
| 2012/0250867 A1 | 10/2012 | Kambayashi et al. | |
| 2013/0022196 A1 | 1/2013 | Kambayashi et al. | |
| 2013/0259227 A1 | 10/2013 | Hanatani et al. | |
| 2014/0173283 A1 | 6/2014 | Hanatani et al. | |
| 2015/0117298 A1* | 4/2015 | Hanatani | ............... H04L 9/0833 370/312 |

FOREIGN PATENT DOCUMENTS

| | | |
|---|---|---|
| JP | 2012-204897 A | 10/2012 |
| JP | 2012-205088 A | 10/2012 |

OTHER PUBLICATIONS

Yoshikazu Hanatani, et al., "Detailed Proposal to IEEE 802.21d based on MKB for TGd", IEEE P802.21 Media Independent Handover Services, 21-13-0002-01-MuGM, 2013, pp. 1-41.

* cited by examiner

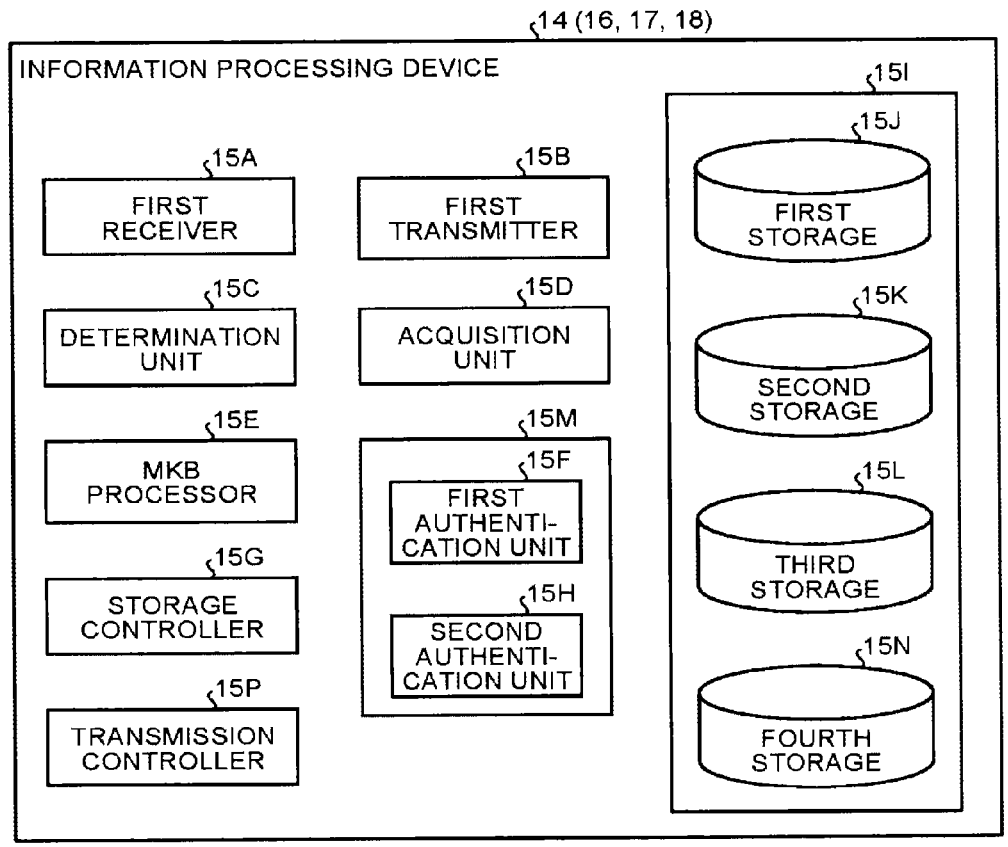

| GROUP KEY | VALID PERIOD |
|---|---|
| KMT1 | 2013-03-13 8:00-12:00 |
| KMT2 | 2013-03-13 8:00-12:00 |
| KALL | 2013-03-13-2013-03-30 8:00-20:00 |
| KG1 | 2013-03-13-2013-06-30 8:00-20:00 |
| KG2 | 2013-03-13-2013-03-30 8:00-20:00 |

FIG.7

| TYPE INFORMATION | IMPORTANCE LEVEL OF COMMUNICATION PURPOSE | VALID PERIOD CALCULATION FORMULA |
|---|---|---|
| FIRST TYPE INFORMATION | LOW | |
| FIRST TYPE INFORMATION | MEDIUM | |
| FIRST TYPE INFORMATION | HIGH | |
| SECOND TYPE INFORMATION | LOW | |
| SECOND TYPE INFORMATION | MEDIUM | |
| SECOND TYPE INFORMATION | HIGH | |
| THIRD TYPE INFORMATION | LOW | |
| THIRD TYPE INFORMATION | MEDIUM | |
| THIRD TYPE INFORMATION | HIGH | |

12H

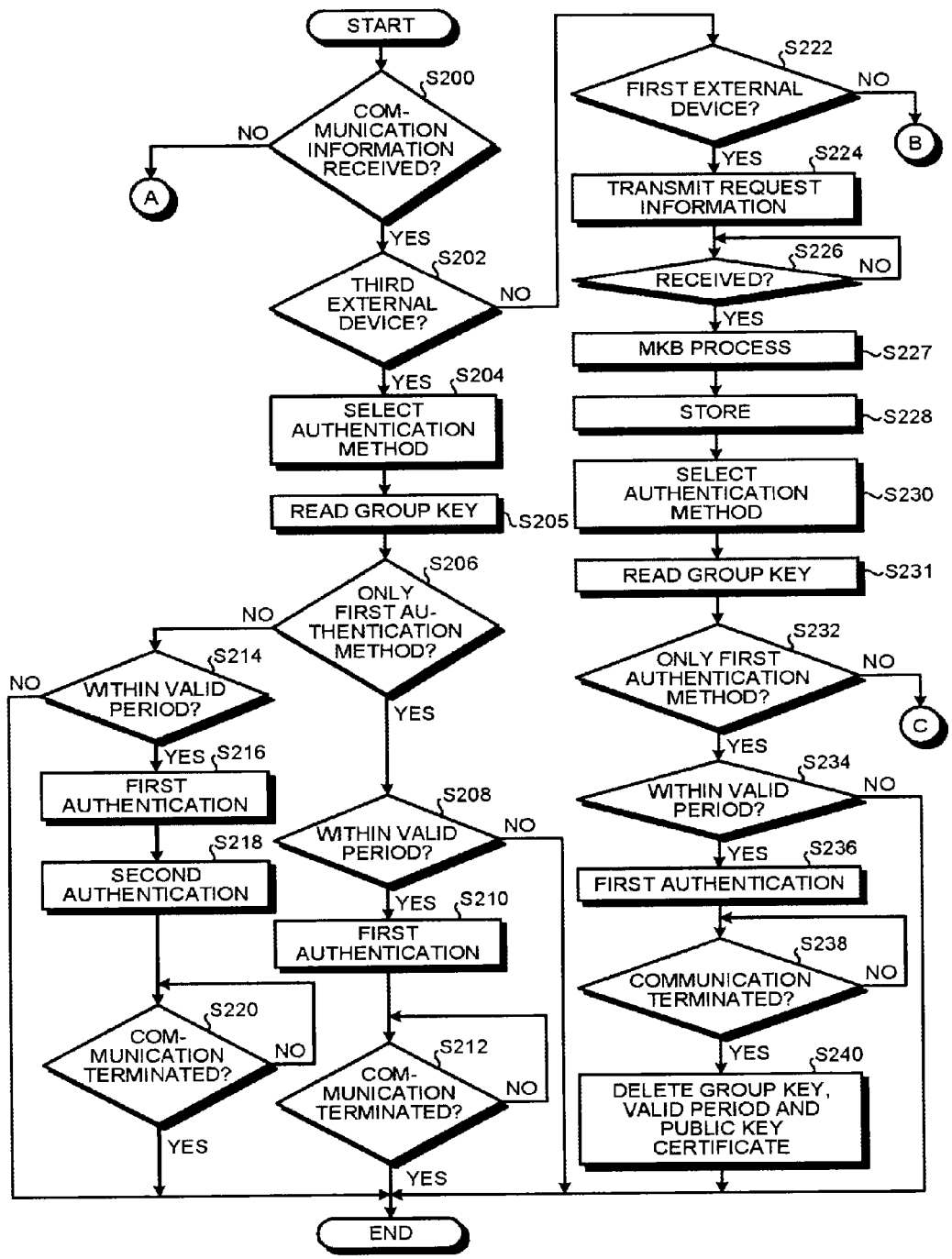

INFORMATION PROCESSING DEVICE, MANAGEMENT APPARATUS, INFORMATION PROCESSING SYSTEM, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2013-196053, filed on Sep. 20, 2013; the entire contents of which are incorporated herein by reference.

FIELD

An embodiment described herein relates generally to an information processing device, a management apparatus, an information processing system, an information processing method, and a computer program product.

BACKGROUND

When renewable energy such as sunlight and wind is used in addition to conventional power generation such as nuclear power and thermal power, a next-generation power network (smart grid) is structured for stabilization of electric power quality.

Here, an apparatus or equipment capable of performing communication is referred to as a "device". In the smart grid, a Metering Data Management System (MDMS), a dispersed power source, a power storage apparatus, a power transmission and distribution controller, an Energy Management System (EMS), a BEMS (Building Energy Management. System), a HEMS (Home Energy Management System), and a smart meter (SM) are the devices.

In a system such as the smart grid, there is a case where two or more devices need to perform encrypted communication. As a technique of the encrypted communication, there is a technique of an MKB (media key block). In this technique, the devices are classified into a plurality of groups according to a predetermined rule. Then, for each group called an MKB, common data is broadcast to the devices belonging to the group. Among the devices belonging to each group, encrypted communication is performed by an authentication method using a group key derived based on the MKB.

However, the encrypted communication based on the authentication method by the key exchange method has not been able to be performed with the devices not belonging to the group.

BRIEF DESCRIPTION OF THE DRAWINGS

FIG. 2 is a block diagram illustrating a function configuration of an information processing device;

FIG. 3 is a diagram illustrating a data structure of a third storage;

FIG. 7 is a diagram illustrating an example of a data structure of a sixth storage;

FIGS. 9A and 9B illustrate a flowchart of a procedure of information processing.

DETAILED DESCRIPTION

According to an embodiment, an information processing device is connected to a management apparatus via a network. The device includes a first receiver, an acquisition unit, an MKB processor, and an authentication unit. The first receiver is configured to receive communication information. The acquisition unit is configured to acquire a media key block from the management apparatus, in response to receipt of the communication information from a first external device not belonging to a group previously classified on a management unit basis by the management apparatus, the first external device and the information processing device being enabled to derive a first group key based on the media key block.

The MKB processor is configured to generate the first group key from a device key of the information processing device and the media key block. The authentication unit is configured to perform encrypted communication with the first external device based on a first authentication method using the first group key.

Figure 1:
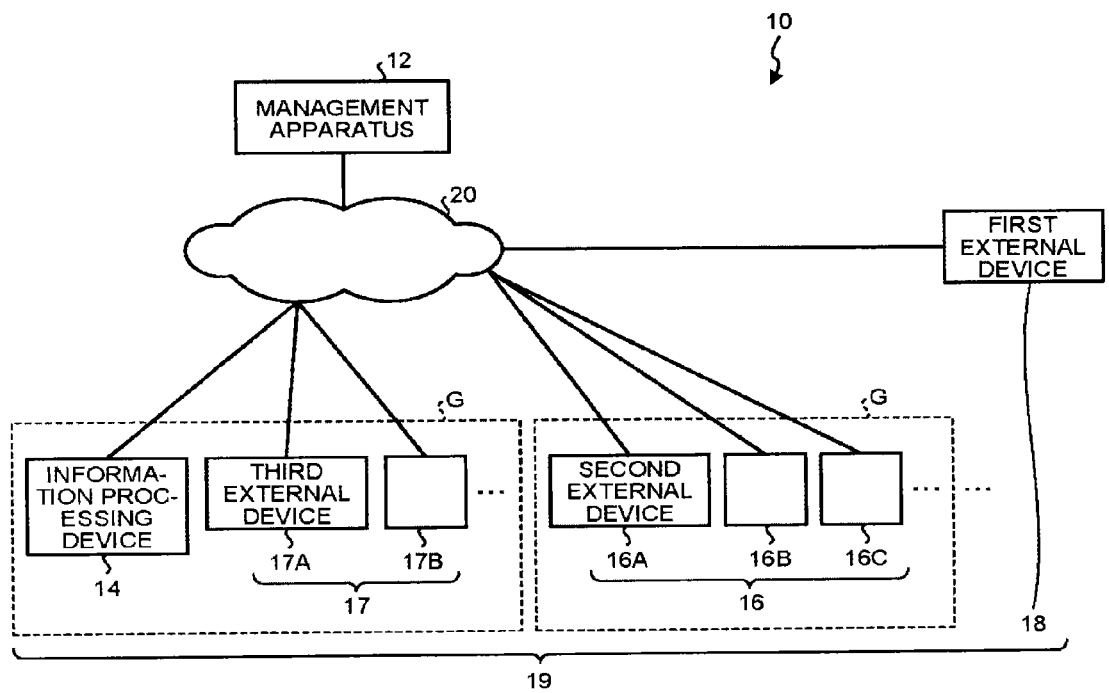
FIG. 1 is a block diagram of an information processing system according to an embodiment.

An embodiment will be explained in detail below with reference to the accompanying drawings. FIG. 1 is a block diagram illustrating an example of an information processing system 10 according to the present embodiment. The information processing system 10 includes a management apparatus 12 and a plurality of devices 19. The management apparatus 12 and the plurality of devices 19 are connected via a network 20. As the network 20, any network form such as the Internet can be applied.

The management apparatus 12 is an apparatus that manages, for example, a key used for encrypted communication among the devices 19. The devices 19 perform encrypted communication among the devices 19.

The devices 19 are, for example, a Metering Data Management System (MDMS), a dispersed power source, a power storage apparatus, a power transmission and distribution controller, an Energy Management System (EMS), a BEMS, a HEMS, and a Smart Meter (SM).

The devices 19 are previously classified into a plurality of groups on a management unit basis by the management apparatus 12 (see dotted line G in FIG. 1). The management unit is, for example, a multicast unit of an MKB. That is, the group indicates a management unit by the management apparatus 12. In other words, the group indicates a management unit into which the plurality of devices 19 is classified according to a predetermined rule. One or more devices 19 belong to each group. Furthermore, there is the device 19 not belonging to any group. The management unit is previously determined according to, for example, an installation region, an installation space and an administrator of the device 19.

The devices 19 each have a similar configuration, but are classified into a plurality of types depending on the group to which each of the devices 19 belongs. In the present embodiment, the devices 19 include an information processing device 14, a first external device 18, a second external device 16, and a third external device 17. The information processing device 14 is the device 19 that accepts communication information from another device 19 to initiate encrypted communication. In the present embodiment, explanation will be made based on an assumption that one device 19 that belongs to a certain group is the information processing device 14.

Among the devices 19, the first external device 18 is a device that does not belong to any group. Among the devices 19, the second external device 16 and the third external device 17 are the device 19 that transmits communication information to the information processing device 14 to initiate encrypted communication. The second external device 16 is the device 19 that belongs to a group different from the information processing device 14. The third external device 17 is the device 19 that belongs to the same group as the information processing device 14.

In the group to which the information processing device 14 belongs, a plurality of third external devices 17A to 17B may be included. The third external device 17A to the third external device 17B are collectively referred to as the third external device 17 in the explanation. In the group that is different from the group to which the information processing device 14 belongs, a plurality of second external devices 16A to 16C may be included. The second external device 16A to the second external device 16C are collectively referred to as the second external device 16 in the explanation.

In FIG. 1, a case where classification is made into two groups is exemplified for simple explanation. However, the classification may be made into three or more groups.

FIG. 2 is a block diagram illustrating a function configuration of the information processing device 14. Here, the second external device 16, the third external device 17, and the first external device 18 each have a similar function configuration to that of the information processing device 14.

The information processing device 14 includes a first receiver 15A, a first transmitter 15B, a determination unit 15C, an acquisition unit 15D, an MKB processor 15E, an authentication unit 15M, a storage controller 15G, a transmission controller 15P, and a storage 15I. The first receiver 15A, the first transmitter 15B, the determination unit 15C, the acquisition unit 15D, the MKB processor 15E, the authentication unit 15M, the transmission controller 15P, and the storage controller 15G may be achieved, for example, by allowing a processing device such as a CPU (Central Processor) to execute a program, that is, by software; by hardware such as an IC (Integrated Circuit); or by a combination of software and hardware.

The storage 15I is a storage medium such as a hard disk drive (HDD), and stores various data. The storage 15I includes a first storage 15J, a second storage 15K, a third storage 15L and a fourth storage 15N. The first storage 15J, the second storage 15K, the third storage 15L and the fourth storage 15N may be separate storage media or the like, or may be different storage areas in one storage medium.

FIG. 3 is a diagram illustrating an example of a data structure of the third storage 15L. The third storage 15L previously stores a communication purpose and an importance level of the communication purpose in a corresponded manner. In the present embodiment, it is assumed that another device 19 accesses the information processing device 14 for transmitting communication information for the purpose of maintenance, inspection and the like. Therefore, in the present embodiment, the explanation will be made based on an assumption that the communication purpose is, for example, basic operation confirmation, firewall (F/W) update, and data update of a key or the like, of the information processing device 14. Regarding the importance level of a communication purpose, a higher importance level is previously assigned as the communication content has higher confidentiality and secrecy. For this reason, for example, the communication purpose "basic operation confirmation" is previously corresponded to the importance level of a communication purpose "low". The communication purposes "F/W update" and "data update" are previously corresponded to the importance level of a communication purpose "high".

Here, allocation of a type of communication purpose and an importance level of the corresponding communication purpose is not limited to the above-described form. For example, the third storage 15L may store further types of communication purposes and further finely classified importance levels in a corresponded manner.

Figure 4:
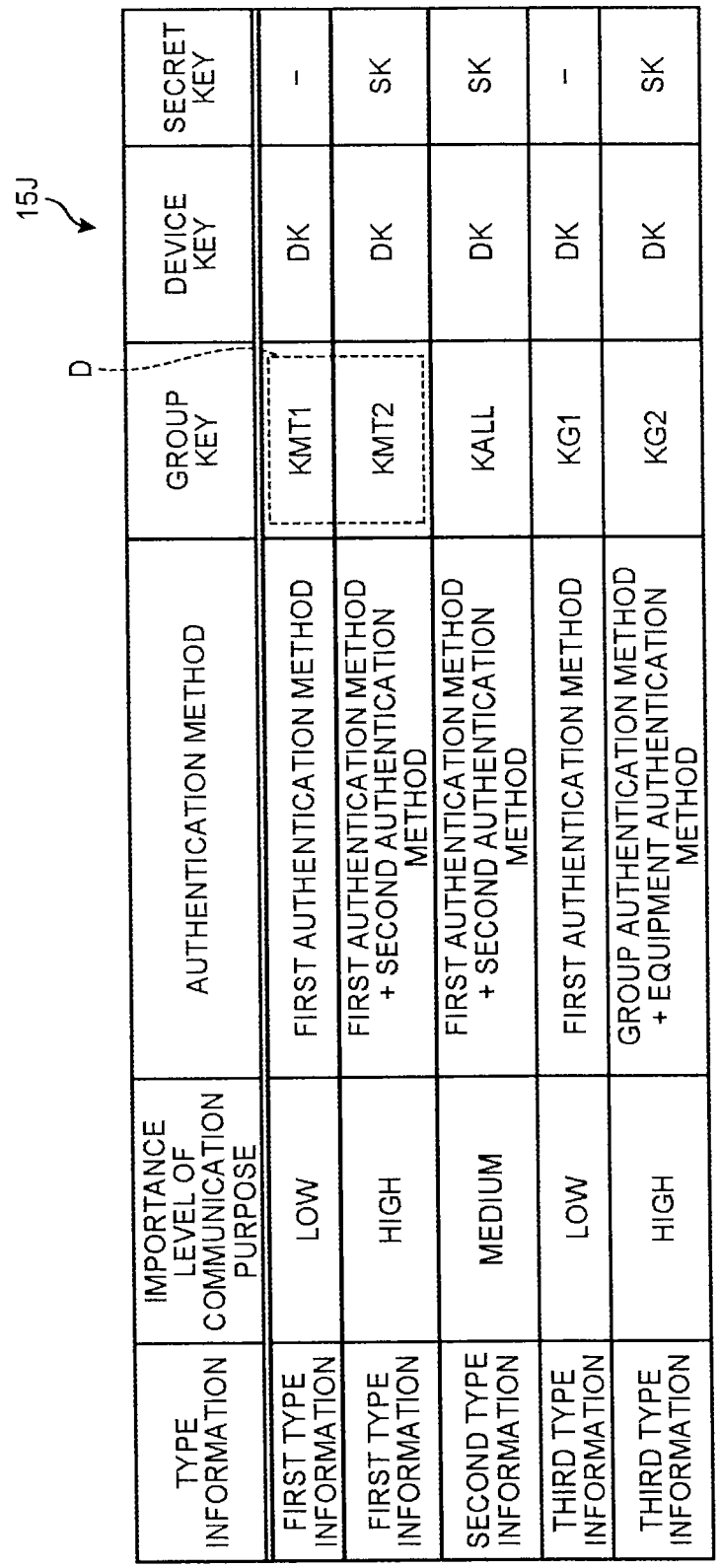
FIG. 4 is a diagram illustrating a data structure of a first storage.

FIG. 4 is a diagram illustrating an example of a data structure of the first storage 15J. The first storage 15J stores type information, an importance level of a communication purpose, an authentication method, a group key, a device key, and a secret key in a corresponded manner.

The type information indicates the type of the device 19. The type information is information indicating a relationship of belonging to a group of another device 19 with respect to the group to which the information processing device 14 belongs. Specifically, there are three types of information including first type information, second type information, and third type information. The first type information indicates a first external device that does not belong to any group. The second type information indicates the second external device 16 that belongs to a group different from the information processing device 14. The third type information indicates the third external device 17 that belongs to the same group as the information processing device 14.

The authentication method is previously determined for each combination of type information and an importance level of a communication purpose. The authentication method is a method of authentication by an authenticated key exchange. The authenticated key exchange includes a method based on a public key cryptosystem and a method based on a pre-shared key. In the present embodiment, as a method based on the pre-shared key, a first authentication method is employed. Also, as a method based on the public key cryptosystem, a second authentication method is employed.

The first authentication method is a publicly known method of performing authenticated key exchange (that is, mutual authentication (hereinafter, referred to as first authentication in some cases)) using a group key as a shared key. The second authentication method is authenticated key exchange (that is, mutual authentication (hereinafter, referred to as second authentication in some cases)) by a publicly known public key cryptosystem.

The authentication method stored in the first storage 15J includes one or more authentication methods each containing at least the first authentication method. In the present embodiment, as an example, the explanation will be made based on an assumption that there are two authentication methods. One is a case of only the first authentication method, and the other is a case of a combination of the first authentication method and the second authentication method. Here, the authentication method may further have a configuration of a combination of three or more types of authentication methods.

In the present embodiment, the first storage 15J stores the authentication method of a combination of the first authentication method and the second authentication method so as to be previously corresponded to the importance level of a communication purpose "medium" or "high". Also, the first storage 15J stores only the first authentication method so as to be previously corresponded to the importance level of a communication purpose "low". As the importance level is higher, the first storage 15J previously stores a combination of more types of authentication methods so as to be previously corresponded to the higher importance level.

The group key is a key used during encrypted communication based on the first authentication method. There are three types of group keys including a first group key, a second group key, and a third group key. The first group key is a group key used when performing encrypted communication based on the first authentication method with the first external device 18. The second group key is a group key used when performing encrypted communication based on the second authentication method with the second external device 16. The third group key is a group key used when performing encrypted communication based on the first authentication method with the third external device 17. Here, the first group key, the second group key and the third group key are collectively referred to as merely the "group key".

In the present embodiment, one type of group key is previously determined for each combination of type information and an importance level of a communication purpose. That is, the first group key, the second group key and the third group key each are further classified into a plurality of types depending on an importance level of a communication purpose.

In an example illustrated in FIG. 4, as the first group key corresponding to the first type information, two types of first group keys are presented. Specifically, "KMT1" and "KMT2" are presented. The "KMT1" is the first group key corresponding to the importance level of a communication purpose "low", and the "KMT2" is the first group key corresponding to the importance level of a communication purpose "high". Also, as the second group key corresponding to the second type information, one type of second group key is presented. That is, the second group key "KALL" corresponding to the importance level of a communication purpose "medium" is presented. The "KALL" is, for example, a key shared and used in the whole area (for example, in all buildings) managed by the information processing system 10.

Also, as the third group key corresponding to the third type information, two types of third group keys are presented. Specifically, "KG1" and "KG2" are presented. The "KG1" is the third group key corresponding to the importance level of a communication purpose "low", and the "KG2" is the third group key corresponding to the importance level of a communication purpose "high". The third group key is a key shared and used only in a specific device 19 in a specific group.

Here, as will be described in detail later, the first group keys corresponding to the first type information indicating the first external device 18 (see an inside of dotted line D in FIG. 4), among the group keys stored in the first storage 15J, are controlled to be temporarily stored and deleted by the later-described information processing. That is, the group keys corresponding to the second type information and the third type information are previously stored in the first storage 15J. On the other hand, the group key corresponding to the first type information (see an inside of dotted line D in FIG. 4) is not previously stored in the first storage 15J, and is temporarily stored and then deleted through the later-described information processing (described in detail later).

The device key is identification information for uniquely identifying each of the devices 19. The device key is previously determined for each of the devices 19. The secret key is a key used during encrypted communication based on the second authentication method.

Figures 5, 6:
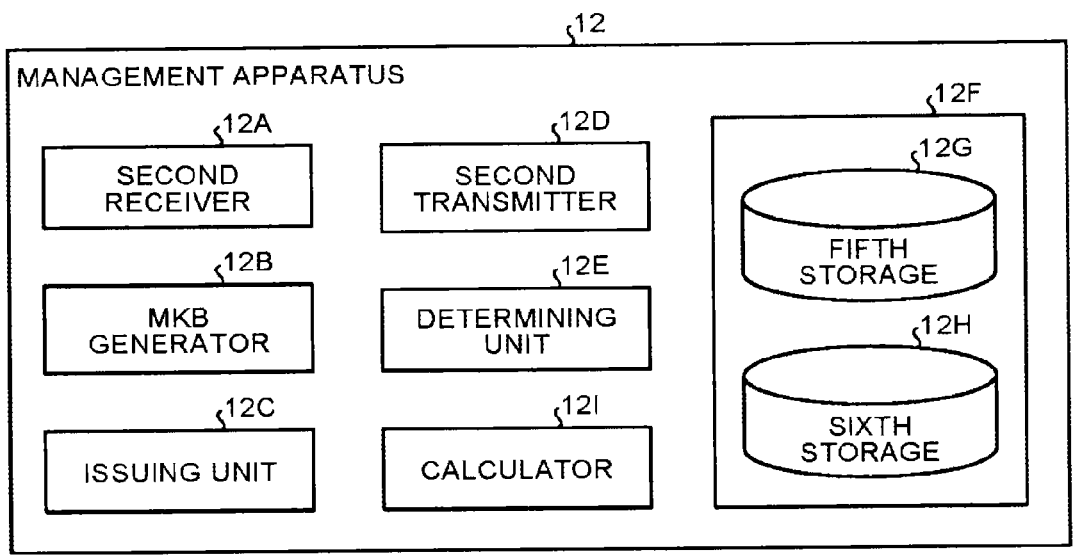
FIG. 5 is a diagram illustrating a data structure of a second storage.
FIG. 6 is a block diagram illustrating a function configuration of a management apparatus.

FIG. 5 is a diagram illustrating an example of a data structure of the second storage 15K. The second storage 15K stores a group key and a valid period in a corresponded manner. The group key is similar to the group key stored in the first storage 15J. The valid period indicates a valid period of the corresponding group key. In the present embodiment, the explanation will be made based on an assumption that the valid period is expressed by year, month and date as well as a time period (hereinafter, referred to as a date and time). Here, the valid period may be one or a combination of some of year, month, date and time.

The second storage 15K previously stores a group key and a valid period corresponding to the second type information and the third type information. On the other hand, a group key and a valid period corresponding to the first type information (see an inside of dotted line D in FIG. 5) are not previously stored in the second storage 15K, and are controlled to be temporarily stored and then deleted by the later-described information processing.

Returning to FIG. 2, the first receiver 15A receives communication information from another device 19 via the network 20. The communication information contains a device key and an importance level of a communication purpose for the device 19 that is a transmission source of the communication information. The first transmitter 15B transmits various information to another device 19 (the third external device 17, the first external device 18, or the second external device 16) and the management apparatus 12.

The determination unit 15C determines which of the first external device 18, the second external device 16 and the third external device 17 is the transmission source of the communication information received by the first receiver 15A. The determination unit 15C performs the determination by, for example, transmitting a group inquiry request to the management apparatus 12, and reading a determination result received from the management apparatus 12 in response to the group inquiry request. Here, the determination method of the determination unit 15C is not limited to this form. For example, the storage 15I previously stores the identification information of each group and the device key of the device 19 belonging to each group, in a corresponded manner. The determination unit 15C may perform the determination by searching the storage 15I to determine if the device key contained in the communication information received by the first receiver 15A belongs to the same group as the information processing device 14, or belongs to another group, or does not belong to any group.

The acquisition unit 15D acquires a media key block (hereinafter, referred to as an MKB) and a valid period from the management apparatus 12, in response to receipt of communication information from the first external device 18, the first external device 18 and the information processing device 14 being enabled to derive a first group key based on the media key block.

This MKB is an MKB that has been prepared in the management apparatus 12 from the device key of the first external device 18 and the device key of the information processing device 14. The valid period is a valid period of the group key derived based on the MKB.

Specifically, the determination unit 15C is assumed to have determined that the transmission source of the communication information is the first external device 18. At this time, the acquisition unit 15D transmits request information to the management apparatus 12. The request information contains the device key and the importance level of a communication purpose contained in the communication information received from the first external device 18, and the device key of the information processing device 14. The acquisition unit 15D receives an MKB and a valid period from the management apparatus 12 in response to the request information, to acquire the MKB and the valid period.

In the present embodiment, the acquisition unit 15D acquires, in response to receipt of the communication information from the first external device 18, a public key certificate of the first external device 18 in addition to the MKB and the valid period, from the management apparatus 12.

Also, from the present embodiment, the acquisition unit 15D acquires, in response to receipt of the communication information from the second external device 16, a public key certificate of the second external device 16 from the management apparatus 12.

Specifically, the determination unit 15C is assumed to have determined that the transmission source of the communication information is the second external device 16. At this time, the acquisition unit 15D transmits request information to the management apparatus 12. The request information contains the device key and the importance level of a communication purpose contained in the communication information received from the second external device 16, and the device key of the information processing device 14. The acquisition unit 15D acquires a public key certificate of the second external device 16 from the management apparatus 12 in response to the request information.

The MKB processor 15E executes MKB processing. The MKB processing is a process of generating a group key from the MKB acquired in the acquisition unit 15D and the device key of the information processing device 14 stored in the first storage 15J.

The storage controller 15G controls storing and deletion of various data to and from the storage 15I. In the present embodiment, the storage controller 15G controls, when a first group key is generated in the MKB processor 15E in response to receipt of the communication information from the first external device 18, to store the first group key in the first storage 15J so as to be corresponded to the first type information and the importance level of a communication purpose contained in the communication information. The storage controller 15G also controls, in response to termination of encrypted communication with the first external device 18 based on the first authentication method using the first group key by the later-described processing of the authentication unit 15M, to delete the first group key from the first storage 15J.

The storage controller 15G also controls, when the valid period is acquired together with the MKB from the management apparatus 12 in response to the receipt of the communication information from the first external device 18, to store the first group key generated from the acquired MKB and the valid period in a corresponded manner in the second storage 15K. The storage controller 15G also controls, in response to termination of encrypted communication with the first external device 18 using the first group key by the later-described processing of the authentication unit 15M, to delete the first group key and the valid period corresponding to the first group key from the second storage 15K.

The authentication unit 15M performs mutual authentication (authenticated key exchange) with another device 19, and performs encrypted communication with the another device 19. The authentication unit 15M includes a first authentication unit 15F and a second authentication unit 15H. The first authentication unit 15F performs authentication by the first authentication method (that is, authenticated key exchange using a group key (first authentication)), and performs encrypted communication with another device 19. The second authentication unit 15H performs authentication by the second authentication method (that is, authenticated key exchange by the public key cryptosystem using a public key and a secret key (second authentication)), and performs encrypted communication with another device 19.

The transmission controller 15P performs control when the information processing device 14 transmits communication information to another device 19.

FIG. 6 is a block diagram illustrating a function configuration of the management apparatus 12. The management apparatus 12 includes a second receiver 12A, an MKB generator 12B, an issuance unit 12C, a second transmitter 12D, a determining unit 12E, a calculator 12I, and a storage 12F. The second receiver 12A, the MKB generator 12B, the issuance unit 12C, the second transmitter 12D, the calculator 12I and the determining unit 12E may be achieved, for example, by allowing a processing device such as a CPU to execute a program, that is, may be achieved by software; may be achieved by hardware such as an IC; or may be achieved by a combination of software and hardware.

The storage 12F stores various data. The storage 12F includes a fifth storage 12G and a sixth storage 12H.

The fifth storage 12G stores a group ID of each group to which the device 19 belongs, and a device key of the device 19 belonging to the group identified by the group ID, in a corresponded manner. The fifth storage 12G stores the device key of the device 19 that does not belong to any group, without being corresponded to a group ID.

In the present embodiment, the fifth storage 12G previously stores one or more group IDs. Here, the group ID and the device key stored in the fifth storage 12G may be appropriately changeable according to an operation instruction to an unillustrated operation unit by a user, a request signal indicating group addition from the device 19, or the like.

The sixth storage 12H stores a valid period calculation formula so as to be corresponded to each combination of type information and an importance level of a communication purpose. FIG. 7 is a diagram illustrating an example of a data structure of the sixth storage 12H. The valid period calculation formula is a calculation formula for calculating a valid period of a group key corresponding to the combination of type information and an importance level of a communication purpose, from the present date and time. The valid period calculation formula is previously defined for each combination of type information of the device 19 and an importance level of a communication purpose. For example, the valid period calculation formula is previously defined so that as the importance level of a communication purpose is higher, the valid period becomes shorter. The valid period calculation formula is also previously defined so that the valid period becomes shorter depending on the type of the device 19 identified by type information, in the order third type information, second type information, and then first type information. Here, the valid period calculation formula is not limited to such a rule.

Returning to FIG. 6, the second receiver 12A receives request information and group inquiry information from the device 19. The request information includes at least one of an MKB request and a public key certificate issuance request. The MKB request includes an MKB request instruction requesting MKB generation, the device key of the information processing device 14, the device key of the first external device 18, and the importance level of a communication purpose of the first external device 18. The public key certificate issuance request includes a certificate request instruction requesting issuance of a public key certificate, the device key of the information processing device 14, and the device key of the first external device 18.

The group inquiry information includes an inquiry request of the group to which the device 19 belongs, the device key of the information processing device 14 that is the transmission source of the group inquiry information, and the device key of the device 19 that is the inquiry object.

The MKB generator 12B generates an MKB, when the request information received in the second receiver 12A contains an MKB request. Specifically, the MKB generator 12B generates an MKB from which only the information processing device 14 and the first external device 18 are enabled to derive a first group key, using the device key of the information processing device 14 and the device key of the first external device 18 contained in the MKB request. As a method of generating the MKB, a CS method, an SD (Subset Difference) method, an LKH (Logical Key Hierarchy) method and the like are already known, and any method including such methods can be employed.

The calculator 12I calculates, when the request information received by the second receiver 12A contains an MKB request, the valid period of the first group key derived based on the MKB generated in the MKB generator 12B. The calculator 12I reads the device keys of the information processing device 14 and the first external device 18 from the MKB request. Then, the calculator 12I searches the fifth storage 12G for the group corresponding to the read device keys. Thus, the calculator 12I determines if the type information of the first external device 18 is the first type information, the second type information, or the third type information. Next, the calculator 12I searches the fifth storage 12G for the valid period calculation formula corresponding to the determined type information and the importance level of a communication purpose contained in the MKB request. Furthermore, the calculator 12I calculates the valid period of the first group key generated in the MKB generator 12B, using the valid period calculation formula searched for and the present date and time.

The issuance unit 12C issues a public key certificate, when the request information received in the second receiver 12A contains a public key certificate issuance request. The issuance unit 12C is a certificate authority that issues a public key necessary for authentication between the information processing device 14 and the first external device 18 which are identified by the device keys contained in the public key certificate issuance request.

The determining unit 12E determines, in response to receipt of the group inquiry information in the second receiver 12A, if the device 19 identified by the device key contained in the group inquiry information is the third external device 17, the second external device 16, or the first external device 18. Specifically, the determining unit 12E searches the fifth storage 12G for the group ID corresponding to the device key of the device 19 as the inquiry object. The device key is contained in the group inquiry information. Thus, the determining unit 12E determines whether or not the device 19 is the first external device 18 that does not belong to any group. The determining unit 12E also determines whether or not the group ID of the group to which the device 19 belongs coincides with the group ID of the group to which the information processing device 14 belongs. Thus, the determining unit 12E determines if the device 19 as the inquiry object is the third external device 17 which belongs to the same group as the information processing device 14, or the second external device 16 which belongs to a different group from the information processing device 14.

Figure 8:
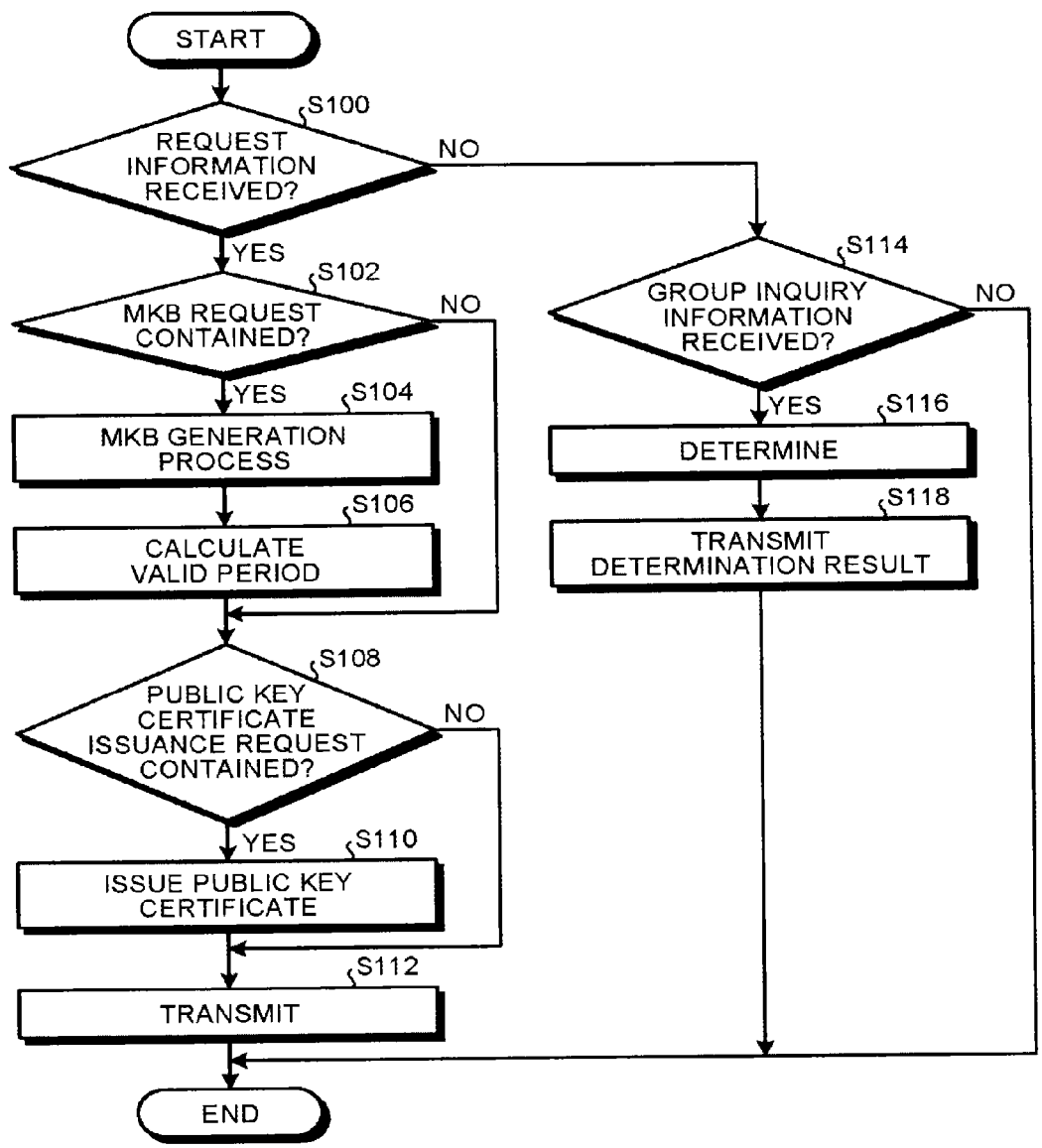
FIG. 8 is a flowchart illustrating a procedure of management processing.

Next, a management process to be executed in the management apparatus 12 will be explained. FIG. 8 is a flowchart illustrating a procedure of the management process to be executed in the management apparatus 12.

The second receiver 12A determines whether or not request information is received (step S100). When the request information is received (step S100: Yes), the MKB generator 12B determines whether or not an MKB request is contained in the request information (step S102). When the MKB request is not contained in the request information (step S102: No), the process proceeds to the later-described step S108.

When the MKB request is contained in the request information received in step S100 (step S102: Yes), the MKB generator 12B performs an MKB generation process (step S104). The MKB generator 12B generates an MKB from which only the information processing device 14 and the first external device 18 are enabled to derive the first group key, using the device keys of the information processing device 14 and the first external device 18 contained in the MKB request.

Next, the calculator 12I calculates the valid period of the first group key, using the device keys of the information processing device 14 and the first external device 18 contained in the MKB request, and an importance level of communication information (step S106).

Next, the issuance unit 12C determines whether or not a public key certificate issuance request is contained in the request information (step S108). When the public key certificate issuance request is determined to be not contained (step S108: No), the process proceeds to the later-described step S112. When the public key certificate issuance request is determined to be contained (step S108: Yes), the issuance unit 12C issues a public key certificate (step S110).

Next, the second transmitter 12D prepares response information containing the MKB generated in the above step S104, the valid period calculated in step S106, and the public key certificate issued in the above step S110. Then, the second transmitter 12D transmits the prepared response information to the information processing device 14 as the transmission source of the request information received in the above step S100, and to the second external device 16 or the first external device 18 identified by the device key contained in the request information (step S112). Then, the present routine is terminated.

Here, when processing by any one of step S104, step S106 and step S110 is not performed, the second transmitter 12D transmits response information which does not contain the information to be obtained by each processing (any one of the MKB, the valid period and the public key certificate).

On the other hand, when a negative determination is made in the above step S100 (step S100: No), the second transmitter 12D determines whether or not group inquiry information is received (step S114). When a negative determination is made in step S114 (step S114: No), the present routine is terminated. When a positive determination is made in step S114 (step S114: Yes), the determining unit 12E determines if the device 19 identified by the device key contained in the group inquiry information is the third external device 17, the second external device 16, or the first external device 18 (step S116).

Next, the second transmitter 12D transmits the determination result determined in the determining unit 12E, to the information processing device 14 as the transmission source of the group inquiry information received in the above step S114 (step S118). The determination result contains any one of the third type information indicating the third external device 17, the second type information indicating the second external device 16, and the first type information indicating the first external device 18. Then, the present routine is terminated.

Figure 9B:
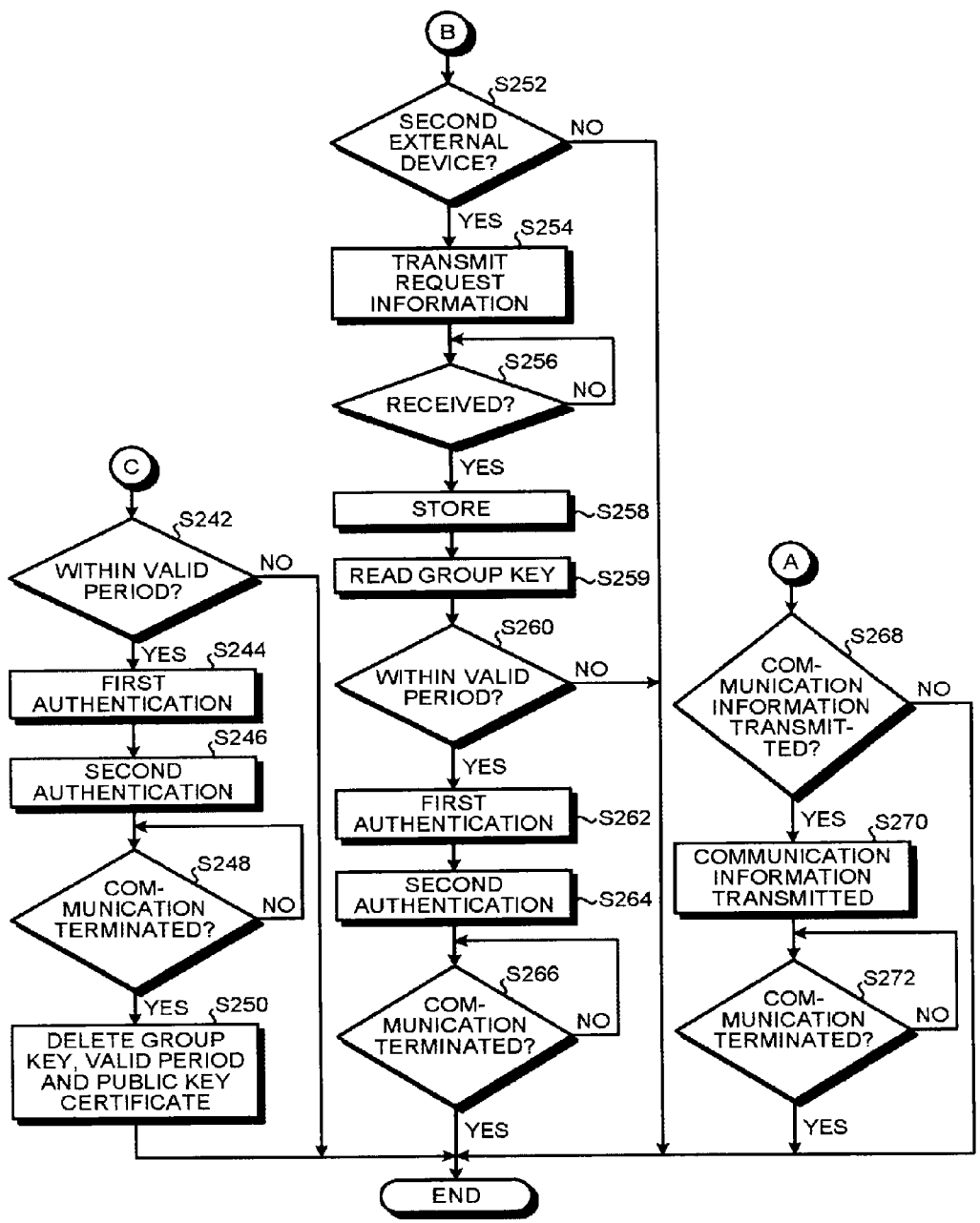

Next, information processing to be executed in the information processing device 14 will be explained. FIGS. 9A and 9B illustrate a flowchart of a procedure of the information processing to be executed in the information processing device 14.

First, the first receiver 15A determines whether or not communication information is received (step S200). When the communication information is determined to be received (step S200: Yes), the determination unit 15C determines whether or not the transmission source of the communication information is the third external device 17 (step S202). In the present embodiment, the determination unit 15C transmits a group inquiry request to the management apparatus 12. Then, the determination unit 15C determines whether or not the third type information is contained in the determination result received from the management apparatus 12 in response to the group inquiry request, thereby to perform the determination of step S202.

When the determination unit 15C determines that the transmission source of the communication information is the third external device 17 (step S202: Yes), the authentication unit 15M selects an authentication method (step S204). In step S204, the authentication unit 15M reads the importance level of a communication purpose contained in the communication information received in step S200. The authentication unit 15M reads the authentication method corresponding to the read importance level of a communication purpose and the third type information as the type information of the third external device 17 determined in the determination unit 15C, from the first storage 15J. Accordingly, the authentication unit 15M selects an authentication method.

Next, the authentication unit 15M reads the third group key corresponding to the importance level of a communication purpose read in step S204 and the third type information as the type information of the third external device 17 determined in the determination unit 15C, from the first storage 15J (step S205).

Next, the authentication unit 15M determines whether or not the authentication method selected in step S204 is only the first authentication method (step S206). When the authentication method selected in step S204 is only the first authentication method (step S206: Yes), the process proceeds to step S208.

For example, the authentication method selected by the authentication unit 15M is assumed to have been the "first authentication method" corresponding to the third type information and the importance level of a communication purpose "low" in the first storage 15J (see FIG. 4). In this case, the authentication unit 15M makes a positive determination in step S206.

Next, the authentication unit 15M determines whether or not the reception date and time of the communication information in the above step S200 is within the valid period of the third group key read in step S205 (step S208). The authentication unit 15M reads the valid period corresponding to the third group key in the second storage 15K, and performs the determination.

When the authentication unit 15M determines that the date and time is outside the valid period (step S208: No), the present routine is terminated without performing communication with the third external device 17. When the authentication unit 15M determines that the date and time is within the valid period (step S208: Yes), the process proceeds to step S210. In step S210, the first authentication unit 15F performs authentication (first authentication) based on the first authentication method using the third group key read in step S205 (step S210). The processing of step S210 initiates encrypted communication with the third external device 17 as the transmission source of the communication information received in step S200.

Next, the authentication unit 15M repeats a negative determination (step S212: No) until the encrypted communication with the third external device 17 is terminated, and when terminated (step S212: Yes), the present routine is terminated.

The authentication unit 15M determines, for example, whether or not the communication from the third external device 17 is interrupted, thereby to perform the determination of step S212. Here, the authentication unit 15M may make a negative determination in step S212 (step S212: No) (determined that the communication is continued), when the communication with the third external device 17 is continued and the present date and time is within the valid period corresponding to the group key read in the above step S205. Then, the authentication unit 15M may make a positive determination in step S212 (step S212: Yes), when the communication with the third external device 17 is interrupted, or when the communication with the third external device 17 is continued, but the present date and time is determined to have become outside the valid period.

On the other hand, when a negative determination is made in the above step S206 (step S206: No), the process proceeds to step S214. For example, the authentication method selected by the authentication unit 15M is assumed to have been the "first authentication method+second authentication method" which is the authentication method corresponding to the third type information and the importance level of a communication purpose "high" in the first storage 15J (see FIG. 4). In this case, the authentication unit 15M makes a negative determination in step S206.

Next, the authentication unit 15M determines whether or not the reception date and time of the communication information in the above step S200 is within the valid period of the third group key read in step S205 (step S214). The authentication unit 15M reads the valid period corresponding to the third group key in the second storage 15K, and performs the determination.

When the authentication unit 15M determines that the date and time is outside the valid period (step S214: No), the present routine is terminated without performing communication with the third external device 17. When the authentication unit 15M determines that the date and time is within the valid period (step S214: Yes), the process proceeds to step S216. In step S216, the first authentication unit 15F performs authentication (first authentication) based on the first authentication method using the third group key read in step S205 (step S216).

Next, the second authentication unit 15H performs authentication based on the second authentication method (second authentication) (step S218). The second authentication unit 15H reads the public key certificate corresponding to the device key of the third external device 17 contained in the communication information received in step S200, from the fourth storage 15N. The second authentication unit 15H also reads the secret key corresponding to the importance level of a communication purpose read in step S204 and the third type information as the type information of the third external device 17 determined in the determination unit 15C, from the first storage 15J. Next, the second authentication unit 15H derives a public key from the read public key certificate, and performs mutual authentication (second authentication) by a publicly known public key cryptosystem, using the derived public key and the secret key.

The processing of step S216 and step S218 initiates encrypted communication with the third external device 17 as the transmission source of the communication information received in step S200.

Next, the authentication unit 15M repeats a negative determination (step S220: No) until the encrypted communication with the third external device 17 is terminated, and when a positive determination is made (step S220: Yes), the present routine is terminated. The determination of step S220 is made in a similar manner to the above step S212.

On the other hand, when a negative determination is made in the above step S202 (step S202: No), the determination unit 15C determines whether or not the transmission source of the communication information in step S200 is the first external device 18 (step S222). The determination unit 15C determines whether or not the first type information is contained in the determination result to the group inquiry request transmitted to the management apparatus 12 in step S202, thereby to perform the determination of step S222.

When the determination unit 15C determines that the transmission source of the communication information is the first external device 18 (step S222: Yes), the process proceeds to step S224. Next, the acquisition unit 15D acquires a media key block (hereinafter, referred to as an MKB) from which the first external device 18 and the information processing device 14 are enabled to derive the first group key, a valid period, and a public key certificate, from the management apparatus 12.

First, the acquisition unit 15D transmits request information containing an MKB request and a public key certificate issuance request, to the management apparatus 12 (step S224). The MKB request contained in this request information contains an MKB request instruction, the device key of the information processing device 14, the device key of the first external device 18, and the importance level of a communication purpose of the first external device 18. The public key certificate issuance request contains a certificate request instruction, the device key of the information processing device 14, and the device key of the first external device 18.

The acquisition unit 15D acquires the device key of the first external device 18 by reading the device key contained in the communication information received in step S200. The acquisition unit 15D also acquires the device key of the information processing device 14 by reading the device key from the storage 15I. Furthermore, the acquisition unit 15D acquires the importance level of a communication purpose of the first external device 18, by reading the importance level from the communication information received in step S200.

Next, the acquisition unit 15D determines whether or not the response information has been received from the management apparatus 12, to the request information transmitted to the management apparatus 12 in the above step S224 (step S226). The acquisition unit 15D repeats a negative determination (step S226: No) until a positive determination is made in step S226 (step S226: Yes). When a positive determination is made in step S226 (step S226: Yes), the process proceeds to step S227.

The response information received from the management apparatus 12 contains the MKB, the valid period, and the public key certificate, as described above. Accordingly, the acquisition unit 15D acquires these information.

Next, the MKB processor 15E executes MKB processing (step S227). The MKB processor 15E performs publicly known MKB processing using the MKB received in step S226 and the device key of the information processing device 14, thereby to calculate the first group key.

Next, the storage controller 15G performs storage control to the storage 15I (step S228). The storage controller 15G allows the public key certificate contained in the response information received in step S226 to be stored in the fourth storage 15N, in such a manner that the public key certificate is corresponded to the device key of the first external device 18 contained in the communication information received in step S200. The storage controller 15G also allows the first group key calculated in step S227 to be stored in the first storage 15J, in such a manner that the first group key is corresponded to the first type information indicating the first external device 18, and the importance level of a communication purpose contained in the communication information received in step S200.

The storage controller 15G also allows the valid period contained in the response information received in step S226 to be stored in the second storage 15K, in such a manner that the valid period is corresponded to the first group key calculated in step S227.

For example, the first group key calculated in step S227 is assumed to have been "KMT1". Also, the importance level of a communication purpose contained in the communication information received in step S200 is assumed to have been "low". Also, the valid period contained in the response information received in step S226 is assumed to have been "2013-03-13 8:00-12:00".

In this case, the storage controller 15G allows "KMT1" as the group key corresponding to the type information "first type information" and the importance level of a communication purpose "low" to be stored in the first storage 15J (see FIG. 4). The storage controller 15G also allows the group key "KMT1" and the valid period "2013-03-13 8:00-12:00" to be stored in a corresponded manner to each other in the second storage 15K (see FIG. 5).

Returning to FIGS. 9A and 9B, next, the authentication unit 15M selects an authentication method (step S230). In step S230, the authentication unit 15M reads the importance level of a communication purpose contained in the communication information received in step S200. The authentication unit 15M reads the authentication method corresponding to the read importance level of a communication purpose and the first type information as the type information of the first external device 18 determined in the determination unit 15C, from the first storage 15J. Accordingly, the authentication unit 15M selects an authentication method.

Next, the authentication unit 15M reads the group key corresponding to the importance level of a communication purpose read in step S230 and the first type information as the type information of the first external device 18 determined in the determination unit 15C, from the first storage 15J (step S231). This group key read in step S231 is a group key calculated by the MKB processing from the MKB contained in the response information received from the management apparatus 12 in the above step S226.

Next, the authentication unit 15M determines whether or not the authentication method selected in step S230 is only the first authentication method (step S232). When the authentication method selected in step S232 is only the first authentication method (step 3232: Yes), the process proceeds to step S234.

For example, the authentication method selected by the authentication unit 15M is assumed to have been the "first authentication method" corresponding to the first type information and the importance level of a communication purpose "low" in the first storage 15J (see FIG. 4). In this case, the authentication unit 15M makes a positive determination in step S232.

Next, the authentication unit 15M determines whether or not the reception date and time of the communication information in the above step S200 is within the valid period of the first group key read in step S231 (step S234). The authentication unit 15M reads the valid period corresponding to the first group key in the second storage 15K, and performs the determination.

When the authentication unit 15M determines that the date and time is outside the valid period (step S234: No), the present routine is terminated without performing communication with the first external device 18. When the authentication unit 15M determines that the date and time is within the valid period (step S234: Yes), the process proceeds to step S236. In step S236, the first authentication unit 15F performs authentication (first authentication) based on the first authentication method using the first group key read in step S231 (step S236). The processing of step S236 initiates encrypted communication with the first external device 18 as the transmission source of the communication information received in step S200.

Next, the authentication unit 15M repeats a negative determination (step S238: No) until the encrypted communication with the first external device 18 is terminated, and when terminated (step S238: Yes), the process proceeds to S240.

The authentication unit 15M determines, for example, whether or not the communication from the first external device 18 is interrupted, thereby to perform the determination of step S238. Here, the authentication unit 15M may make a negative determination in step S238 (step S238: No) (determined that the communication is continued), when the communication with the first external device 18 is continued, and the present date and time is within the valid period corresponding to the first group key read in the above step S231. Then, the authentication unit 15M may make a positive determination in step S238 (step S238: Yes), when the communication with the first external device 18 is interrupted, or when the communication with the first external device 18 is continued, but the present date and time is determined to have become outside the valid period.

Next, the storage controller 15G deletes the first group key, the valid period and the public key certificate each stored in the storage 15I in the above step S228, from the storage 15I (step S240). Then, the present routine is terminated.

On the other hand, when a negative determination is made in the above step S232 (step S232: No), the process proceeds to step S242. For example, the authentication method selected by the authentication unit 15M is assumed to have been the "first authentication method+second authentication method" which is the authentication method corresponding to the first type information and the importance level of a communication purpose "high" in the first storage 15J (see FIG. 4). In this case, the authentication unit 15M makes a negative determination in step S232.

Next, the authentication unit 15M determines whether or not the reception date and time of the communication information in the above step S200 is within the valid period of the first group key read in step S231 (step S242). The authentication unit 15M reads the valid period corresponding to the group key in the second storage 15K, and performs the determination.

When the authentication unit 15M determines that the date and time is outside the valid period (step S242: No), the present routine is terminated without performing communication with the first external device 18. When the authentication unit 15M determines that the date and time is within the valid period (step S242: Yes), the process proceeds to step S244. In step S244, the first authentication unit 15F performs authentication (first authentication) based on the first authentication method using the first group key read in step S231 (step S244).

Next, the second authentication unit 15H performs authentication (second authentication) based on the second authentication method (step S246). The second authentication unit 15H reads the public key certificate corresponding to the device key of the first external device 18 contained in the communication information received in step S200, from the fourth storage 15N. This public key certificate has been received from the management apparatus 12 by the processing of step S226, and stored in the fourth storage 15N by the processing of step S228.

The second authentication unit 15H reads the secret key corresponding to the importance level of a communication purpose read in step S230 and the first type information as the type information of the first external device 18 determined in the determination unit 15C, from the first storage 15J. Next, the second authentication unit 15H derives a public key from the read public key certificate, and performs mutual authentication (second authentication) by a publicly known public key cryptosystem, using the derived public key and the read secret key.

The processing of step S244 and step S246 initiates encrypted communication with the first external device 18 as the transmission source of the communication information received in step S200.

Next, the authentication unit 15M repeats a negative determination (step S248: No) until the encrypted communication with the first external device 18 is terminated, and when a positive determination is made (step S248: Yes), the process proceeds to S250. The determination of step S248 is similar to that of step S238.

Next, the storage controller 15G deletes the first group key, the valid period and the public key certificate each stored in the storage 15I in the above step S228, from the storage 15I (step S250). Then, the present routine is terminated.

On the other hand, when a negative determination is made in the above step S222 (step S222: No), the determination unit 15C determines whether or not the transmission source of the communication information in step S200 is the second external device 16 (step S252). The determination unit 15C determines whether or not the second type information is contained in the determination result to the group inquiry request transmitted to the management apparatus 12 in step S202, thereby to perform the determination of step S252.

When the determination unit 15C determines that the transmission source of the communication information is not the second external device 16 (step S252: No), the present routine is terminated. When the determination unit 15C determines that the transmission source of the communication information is the second external device 16 (step S252: Yes), the process proceeds to step S254.

Next, the acquisition unit 15D acquires a public key certificate from the management apparatus 12. First, the acquisition unit 15D transmits request information containing a public key certificate issuance request to the management apparatus 12 (step S254). The public key certificate issuance request contained in this request information contains a certificate request instruction, the device key of the information processing device 14, and the device key of the second external device 16.

The acquisition unit 15D acquires the device key of the second external device 16 by reading the device key contained in the communication information received in step S200. The acquisition unit 15D also acquires the device key of the information processing device 14 by reading the device key from the storage 15I.

Next, the acquisition unit 15D determines whether or not the response information to the request information transmitted to the management apparatus 12 in the above step S254 has been received from the management apparatus 12 (step S256). The acquisition unit 15D repeats a negative determination (step S256: No) until a positive determination is made in step S256 (step S256: Yes). When a positive determination is made in step S256 (step S256: Yes), the process proceeds to step S258.

The response information received from the management apparatus 12 contains a public key certificate, as described above. Accordingly, the acquisition unit 15D acquires a public key certificate.

Next, the storage controller 15G allows the acquired public key certificate to be stored in the fourth storage 15N, in such a manner that the public key certificate is corresponded to the device key of the second external device 16 contained in the communication information received in step S200 (step S258).

Next, the authentication unit 15M reads the second group key of the second external device 16 (step S259). The authentication unit 15M reads the importance level of a communication purpose contained in the communication information received in step S200. Then, the authentication unit 15M reads the second group key corresponding to the read importance level of a communication purpose, and the second type information as the type information of the second external device 16 determined in the determination unit 15C, from the first storage 15J.

Next, the authentication unit 15M determines whether or not the reception date and time of the communication information in the above step S200 is within the valid period of the second group key read in step S259 (step S260). The authentication unit 15M reads the valid period corresponding to the second group key in the second storage 15K, and performs the determination.

When the authentication unit 15M determines that the date and time is outside the valid period (step S260: No), the present routine is terminated without performing communication with the second external device 16. When the authentication unit 15M determines that the date and time is within the valid period (step S260: Yes), the process proceeds to step S262. In step S262, the first authentication unit 15F performs authentication (first authentication) based on the first authentication method using the second group key read in step S259 (step S262).

Next, the second authentication unit 15H performs authentication (second authentication) based on the second authentication method (step S264). The second authentication unit 15H reads the public key certificate corresponding to the device key of the second external device 16 contained in the communication information received in step S200, from the fourth storage 15N. This public key certificate has been acquired from the second external device 16 in step S259. The second authentication unit 15H also reads the secret key corresponding to the importance level of a communication purpose read in step S259 and the second type information as the type information of the second external device 16 determined in the determination unit 15C, from the first storage 15J. Next, the second authentication unit 15H derives a public key from the read public key certificate, and performs mutual authentication (second authentication) by a publicly known public key cryptosystem, using the derived public key and the read secret key.

The processing of step S262 and step S264 initiates encrypted communication with the second external device 16 as the transmission source of the communication information received in step S200.

Next, the authentication unit 15M repeats a negative determination (step S266: No) until the encrypted communication with the second external device 16 is terminated, and when a positive determination is made (step S266: Yes), the present routine is terminated.

The authentication unit 15M determines, for example, whether or not the communication from the second external device 16 is interrupted, thereby to perform the determination of step S266. Here, the authentication unit 15M may make a negative determination in step S266 (step S266: No) (determined that the communication is continued), when the communication with the second external device 16 is continued, and the present date and time is within the valid period corresponding to the group key read in the above step S259. Then, the authentication unit 15M may make a positive determination in step S266 (step S266: Yes), when the communication with the second external device 16 is interrupted, or when the communication with the second external device 16 is continued, but the present date and time is determined to have become outside the valid period.

On the other hand, when a negative determination is made in the above step S200 (step S200: No), the process proceeds to step S268.

In step S268, the transmission controller 15P determines whether or not communication information is to be transmitted to another device 19 (step S268). For example, an instruction of initiating communication with another device 19 is assumed to have been made by an operation instruction to an unillustrated operation unit in the information processing device 14 by a user. The transmission controller 15P determines whether or not the instruction of initiating communication has been accepted from the operation unit (unillustrated), thereby to perform the determination of step S268.

When a negative determination is made in step S268 (step S268: No), the present routine is terminated. When a positive determination is made in step S268 (step S268: Yes), the process proceeds to step S270. In step S270, the transmission controller 15P transmits communication information to another device 19 (step S270).

For example, the transmission controller 15P displays, in response to acceptance of the communication initiation instruction from the operation unit (unillustrated), a list of communication purposes stored in the third storage 15L (see FIG. 3) and a list of the device keys of other devices 19 as the communication objects, on a display unit (unillustrated). The list of device keys of the devices 19 is acquired by reading the device keys of all the devices 19 managed in the management apparatus 12 from the management apparatus 12. The list of the devices 19 may also be acquired by previously storing the list in the storage 15I and reading the stored list from the storage 15I.

Then, a user selects one communication purpose from the displayed list by operation to the operation unit. The user also selects the device key of the device 19 that is the communication object. When these selections are made, signals indicating the selected communication purpose and device key are output from the operation unit to the transmission controller 15P.

The transmission controller 15P reads the signals thereby to acquire the communication purpose and the device key of the device 19 that is the communication object. The transmission controller 15P reads the importance level of a communication purpose corresponding to the acquired communication purpose, from the third storage 15L. Next, the transmission controller 15P transmits communication information containing the read importance level of a communication purpose and the device key of the information processing device 14 to the device 19 identified by the device key of the communication object.

Another device 19 having accepted the communication information executes the processing of the above-described step S202 to step S266.

Next, the transmission controller 15P repeats a negative determination (step S272: No) until the communication with another device 19 is determined to be terminated, and when the communication is determined to be terminated (step S272: Yes), the present routine is terminated. Here, response information containing an MKB is assumed to have been received from the management apparatus 12, after the processing of step S270 and before the determination of step S272. When a public key certificate is contained in the response information, the second authentication unit 15H performs authentication (second authentication) based on the second authentication method using the public key certificate. Also, when an MKB is contained in the response information, the first authentication unit 15F performs authentication (first authentication) based on the first authentication method. Accordingly, the transmission controller 15P performs encrypted communication with another device 19.

As described above, in the information processing device 14 according to the present embodiment, the first receiver 15A receives communication information from another device 19. The acquisition unit 15D acquires, in response to receipt of the communication information from the first external device 18 that does not belong to any group, an MKB from which the first external device 18 and the information processing device 14 are enabled to derive a first group key, from the management apparatus 12. The MKB processor 15E generates a first group key, from the device key of the information processing device 14 and the acquired MKB. The authentication unit 15M performs encrypted communication with the first external device 18, by authentication based on the first authentication method using the first group key.

Thus, in the information processing device 14 according to the present embodiment, when communication information is received from the first external device 18, an MKB is acquired from the management apparatus 12, thereby to perform encrypted communication with the first external device 18 by the first authentication using a group key. Therefore, in the information processing device 14 according to the present embodiment, encrypted communication based on the authentication by the key exchange method using the MKB can be performed even with the device that does not belong to any group.

For example, even when the information processing device 14 as a HEMS is accessed from the device 19 (the first external device 18) as a maintenance terminal that does not belong to any group, to execute maintenance processing corresponding to the above-described communication purpose, encrypted communication based on the authentication by the key exchange method using the MKB can be performed.

Also, in the information processing device 14 according to the present embodiment, when communication information is received from the first external device 18, the group key derived based on the MKB received from the management apparatus 12 is deleted from the storage 15I after termination of the encrypted communication. Accordingly, unauthorized access by the first external device 18 temporarily connected to the information processing device 14 for the purpose of maintenance operation or the like can be inhibited. Therefore, in the information processing device 14 according to the present embodiment, encrypted communication based on the authentication with high confidentiality and safety can be performed, in addition to the above-described effect.

Also, in the information processing device 14 according to the present embodiment, when communication information is received from the first external device 18, an MKB is acquired from the management apparatus 12, thereby to perform encrypted communication by authentication based on the first authentication method using a group key derived based on the MKB. On the other hand, when communication information is received from the second external device 16 or the third external device 17, encrypted communication is performed by authentication based on the first authentication method using a group key previously stored in the storage 15I.

Therefore, in the information processing device 14 according to the present embodiment, encrypted communication can be safely performed while reducing the update frequency of an MKB, in addition to the above-described effect.

Also, in the information processing device 14 according to the present embodiment, a valid period is set for each group key, and encrypted communication is performed only when a reception date and time of communication information is within the valid period corresponding to the group key used in authentication by the first authentication method. Therefore, detailed key management can be performed, in addition to the above-described effect.

Also, in the information processing device 14 according to the present embodiment, a group key is stored in such a manner that it is corresponded to each combination of an importance level of communication purpose and type information of the device 19. Then, using the group key corresponding to the importance level of a communication purpose in communication information and the type information (the first type information, the second type information, and the third type information) of the device 19 that is the transmission source of the communication information, authenticated key exchange based on the first authentication method is performed.

Therefore, in the information processing device 14 according to the present embodiment, further detailed key management can be performed, in addition to the above-described effect.

That is, for example, when the information processing device 14 as a HEMS is accessed from the device 19 that is another HEMS or the device 19 for performing maintenance, to execute maintenance processing corresponding to the above-described communication purpose, encrypted communication can be performed using the group key corresponding to the importance level of the communication purpose as a content of the maintenance and the type information of the device 19.

Also, in the information processing device 14 according to the present embodiment, a plurality of types of authentication methods each including at least the first authentication method is previously stored for each combination of an importance level of a communication purpose and type information of the device 19. Then, encrypted communication with the device 19 is performed, by the authentication method corresponding to the importance level of a communication purpose contained in the received communication information, and the type information of the device 19 that is the transmission source of the communication information.

Therefore, encrypted communication can be performed by the authentication method corresponding to the type of another device 19 (the second external device 16, the third external device 17, or the first external device 18) from which communication information has been transmitted to the information processing device 14, and the communication purpose. That is, for example, when the information processing device 14 as a HEMS is accessed from the device 19 that is another HEMS or the device 19 for performing maintenance, to execute maintenance processing corresponding to the above-described communication purpose, encrypted communication can be performed using the authentication method corresponding to the importance level of a communication purpose as a content of the maintenance and the type information of the device 19. Therefore, in the information processing device 14 according to the present embodiment, encrypted communication based on the authentication method with higher safety can performed, in addition to the above-described effect.

Here, each of the above-described storages can be configured by any commonly used storage medium such as an HDD, an optical disk, a memory card, and RAM (Random Access Memory).

Figure 10:
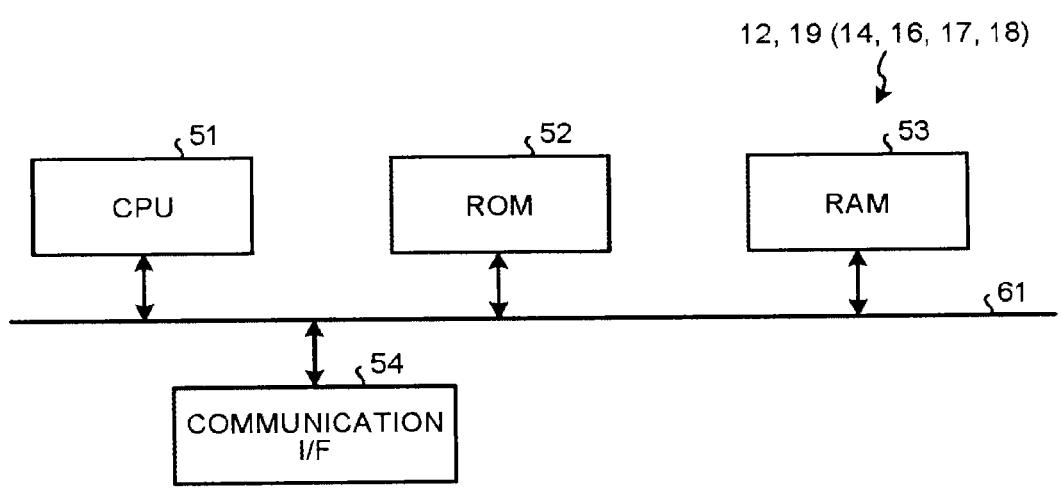
FIG. 10 is a hardware configuration diagram of a management apparatus and devices.

Next, a hardware configuration of the management apparatus 12 and the devices 19 (the information processing device 14, the third external device 17, the second external device 16, and the first external device 18) according to the present embodiment will be explained. FIG. 10 is a schematic diagram illustrating the hardware configuration of the management apparatus 12 and the devices 19 according to the present embodiment.

The management apparatus 12 and the devices 19 according to the present embodiment each include a control device such as a CPU (Central Processor) 51, a storage device such as ROM (Read Only Memory) 52 and RAM 53, a communication I/F 54 that is connected to a network and performs communication, and a bus 61 that connects the components with each other.

A program for executing the above-described processing (the management processing and the information processing) to be executed in each of the management apparatus 12 and the devices 19 according to the present embodiment is provided by being incorporated in the ROM 52 and the like.

The program for executing the above-described processing to be executed in each of the management apparatus 12 and the devices 19 according to the present embodiment may be configured to be provided as a computer program product by being stored in a recording medium that can be read by a computer in a file of an installable format or an executable format. Examples of such a recording medium include a CD-ROM (Compact Disk Read Only Memory), a flexible disk (FD), a CD-R (Compact Disk Recordable) and a DVD (Digital Versatile Disk)

Furthermore, the program for executing the above-described processing to be executed in each of the management apparatus 12 and the devices 19 according to the present embodiment may be configured to be provided by being stored in a computer connected to a network such as the Internet so as to be downloaded via the network. Also, the program to be executed in the devices according to the present embodiment may be configured so as to be provided or distributed via a network such as the Internet.

The program for executing the above-described processing to be executed in each of the management apparatus 12 and the devices 19 according to the present embodiment can cause a computer to function as each of the above-described units. The CPU 51 reads the program from a computer-readable recording medium into a main memory so that this computer can execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device connected to a management apparatus via a network, the information processing device comprising:
   a first receiver configured to receive communication information;
   an acquisition unit configured to acquire a media key block from the management apparatus, in response to receipt of the communication information from a first external device not belonging to a group previously classified on a management unit basis by the management apparatus, the first external device and the information processing device being enabled to derive a first group key based on the media key block, the first group key being a key used when performing encrypted communication based on a first authentication method with the first external device not belonging to the group, and a third group key is used between a third external device belonging to a same group as the information processing device;
   an MKB processor configured to generate the first group key from a device key of the information processing device and the media key block; and
   an authentication unit configured to perform the encrypted communication with the first external device based on the first authentication method using the first group key, wherein
   the authentication unit is configured to perform, in response to receipt of the communication information from the third external device, encrypted communication with the third external device, based on the first authentication method using the third group key.

2. The device according to claim 1, further comprising a storage controller configured to perform control of storing the first group key in a storage when the first group key is generated, and perform control of deleting the first group key from the storage when the encrypted communication is terminated.

3. The device according to claim 1, wherein
the acquisition unit is configured to acquire the media key block and a valid period of the first group key derived based on the media key block, from the management apparatus, and
the authentication unit is configured to perform the encrypted communication with the first external device when a reception date and time of the communication information is within the valid period.

4. The device according to claim 1, further comprising a first storage configured to previously store therein, in association with one another, first type information indicating the first external device, an importance level of a communication purpose, and one or more authentication methods containing at least the first authentication method, wherein
the first receiver is configured to receive the communication information containing an importance level of a communication purpose, and
the authentication unit is configured to perform, in response to receipt of the communication information from the first external device, encrypted communication with the first external device, based on an authentication method corresponding to the importance level of a communication purpose contained in the communication information.

5. The device according to claim 1, further comprising a first storage configured to previously store therein, in association with one another, second type information indicating a second external device belonging to a group different from the information processing device, an importance level of a communication purpose, and a second group key, wherein
the first receiver is configured to receive the communication information containing an importance level of a communication purpose, and
the authentication unit is configured to perform, in response to receipt of the communication information from the second external device, encrypted communication with the second external device, based on the first authentication method using the second group key corresponding to the importance level of a communication purpose contained in the communication information and the second type information.

6. The device according to claim 1, further comprising a first storage configured to previously store therein, in association with one another, third type information indicating the third external device belonging to the same group as the information processing device, an importance level of a communication purpose, and the third group key, wherein
the first receiver is configured to receive the communication information containing the importance level of a communication purpose, and
the authentication unit is configured to perform, in response to receipt of the communication information from the third external device, encrypted communication with the third external device, based on the first authentication method using the third group key, corresponding to the importance level of a communication purpose contained in the communication information and the third type information.

7. The device according to claim 1, further comprising a second storage configured to previously store therein, in association with one another, the third group key and a valid period, wherein the authentication unit is configured to perform encrypted communication with the third external device when a reception date and time of the communication information is within a valid period of the third group key used for encrypted communication based on the first authentication method.

8. An information processing system comprising:
a management apparatus; and
an information processing device connected to the management apparatus via a network, wherein
the information processing device includes:
    a first receiver configured to receive communication information;
    an acquisition unit configured to, in response to receipt of the communication information from a first external device not belonging to a group previously classified on a management unit basis by the management apparatus, transmit request information to the management apparatus, and acquire a media key block from the management apparatus, the request information containing an MKB request instruction of a media key block from which the first external device and the information processing device are enabled to derive a first group key, a device key of the information processing device and a device key of the first external device, the first group key being a key used when performing encrypted communication based on a first authentication method with the first external device not belonging to the group, and a third group key is used between a third external device belonging to a same group as the information processing device;
    an MKB processor configured to generate the first group key from the device key of the information processing device and the media key block;
    an authentication unit configured to perform the encrypted communication with the first external device based on the first authentication method using the first group key, and to perform, in response to receipt of the communication information from the third external device, encrypted communication with the third external device, based on the first authentication method using the third group key,
the management apparatus includes:
    a second receiver configured to receive the request information from the information processing device;
    an MKB generator configured to generate the media key block; and
    a second transmitter configured to transmit the media key block to the information processing device.

9. The system according to claim 8, wherein the information processing device further includes a storage controller configured to perform control of storing the first group key in a storage when the first group key is generated, and perform control of deleting the first group key from the storage when the encrypted communication is terminated.

10. The system according to claim 8, wherein
the acquisition unit is configured to acquire the media key block and a valid period of the first group key derived based on the media key block, from the management apparatus, and
the authentication unit is configured to perform encrypted communication with the first external device when a reception date and time of the communication information is within the valid period.

11. The system according to claim 8, wherein
the information processing device further includes a first storage configured to previously store therein, in association with one another, first type information indicating the first external device, an importance level of a communication purpose, and one or more authentication methods containing at least the first authentication method,
the first receiver is configured to receive the communication information containing an importance level of a communication purpose, and
the authentication unit is configured to perform, in response to receipt of the communication information from the first external device, encrypted communication with the first external device, based on an authentication method corresponding to the importance level of a communication purpose contained in the communication information.

12. The system according to claim 8, wherein
the information processing device further includes a first storage configured to previously store therein, in association with one another, second type information indicating a second external device belonging to a group different from the information processing device, an importance level of a communication purpose, and a second group key,
the first receiver is configured to receive the communication information containing an importance level of a communication purpose, and
the authentication unit is configured to perform, in response to receipt of the communication information from the second external device, encrypted communication with the second external device, based on the first authentication method using the second group key corresponding to the importance level of a communication purpose contained in the communication information and the second type information.

13. The system according to claim 8, wherein
the information processing device further includes a second storage configured to previously store therein, in association with one another, the second group key and a valid period, and
the authentication unit is configured to perform encrypted communication with the second external device when a reception date and time of the communication information is within a valid period corresponding to the second group key used for encrypted communication based on the first authentication method.

14. The system according to claim 8, wherein
the information processing device further includes a first storage configured to previously store therein, in association with one another, third type information indicating the third external device belonging to the same group as the information processing device, an importance level of a communication purpose, and the third group key,
the first receiver is configured to receive the communication information containing an importance level of a communication purpose, and
the authentication unit is configured to perform, in response to receipt of the communication information from the third external device, encrypted communication with the third external device, based on the first authentication method using the third group key, corresponding to the importance level of a communication purpose contained in the communication information and the third type information.

15. An information processing method to be performed by an information processing device connected to a management apparatus via a network, the method comprising:
receiving communication information;
acquiring a media key block from the management apparatus, in response to receipt of the communication information from a first external device not belonging to a group previously classified on a management unit basis by the management apparatus, the first external device and the information processing device being enabled to derive a first group key based on the media key block, the first group key being a key used when performing encrypted communication based on a first authentication method with the first external device not belonging to the group, and a third group key is used between a third external device belonging to a same group as the information processing device;
generating the first group key from a device key of the information processing device and the media key block; and
performing the encrypted communication with the first external device based on the first authentication method using the first group key, wherein
said performing encrypted communication includes performing, in response to receipt of the communication information from the third external device, encrypted communication with the third external device, based on the first authentication method using the third group key.

16. The method according to claim 15, further comprising:
storing the first group key in a storage when the first group key is generated; and
deleting the first group key from the storage when the encrypted communication is terminated.

17. The method according to claim 15, wherein
said acquiring includes acquiring the media key block and a valid period of the first group key derived based on the media key block, from the management apparatus, and
said performing encrypted communication includes performing encrypted communication with the first external device when a reception date and time of the communication information is within the valid period.

18. The method according to claim 15, wherein
said receiving includes receiving the communication information containing an importance level of a communication purpose, and
said performing encrypted communication includes performing, in response to receipt of the communication information from the first external device, encrypted communication with the first external device, based on an authentication method corresponding to the importance level of a communication purpose contained in the communication information, in a first storage configured to previously store therein, in association with one another, first type information indicating the first external device, an importance level of a communication purpose, and one or more authentication methods containing at least the first authentication method.

19. The method according to claim 15, wherein
said receiving includes receiving the communication information containing an importance level of a communication purpose, and
said performing encrypted communication includes performing, in response to receipt of the communication information from the second external device, encrypted communication with the second external device, based on the first authentication method using a second group key corresponding to the importance level of a communication purpose contained in the communication information and the second type information, in a first storage configured to previously store therein, in association with one another, second type information indicating a second external device belonging to a group different from the information processing device, an importance level of a communication purpose, and the second group key.

20. The device according to claim 1, wherein the third group key is retained for a valid period after the encrypted communication is terminated, and the first group key is deleted when the encrypted communication is terminated.

* * * * *